United States Patent Office 3,478,120

Patented Nov. 11, 1969

1

3,478,120

DEALKYLATION PROCESS AND CATALYST

John W. Myers and Marvin M. Johnson, Bartlesville, Okla., assignors to Phillips Petroleum Company, a corporation of Delaware No Drawing. Filed Apr. 9, 1968, Ser. No. 719,850
Int. Cl. C07c 3/58; B01j 11/22
U.S. Cl. 260—672 5 Claims

ABSTRACT OF THE DISCLOSURE

Dealkylation of hydrocarbons by contacting with a catalyst comprising iron group metals and calcium aluminate.

BACKGROUND OF THE INVENTION

This invention relates to a process and catalyst for the dealkylation of hydrocarbons. In accordance with another aspect, this invention relates to the hydrodealkylation of alkyl-aromatic compounds by contacting with an iron group metal-calcium aluminate catalyst. In accordance with a further aspect, this invention relates to a process for the separation of xylenes and ethylbenzene by selectively dealkylating the ethylbenzene in the presence of xylene by contacting with an iron group metal-calcium aluminate catalyst.

The process of hydrodealkylation of alkyl-aromatic hydrocarbons and demethylation of naphthenes and paraffins in the presence of hydrogen to effect conversion thereof to aromatic hydrocarbons, lower molecular weight naphthenes or paraffins and methane, has recently achieved significant importance within the petroleum refining industry. Generally, the demand for greater quantities of high purity aromatic hydrocarbons has increased and the supply available from natural sources has not been sufficient to meet this demand. Aromatic hydrocarbons such as benzene, naphthalene, etc., are adaptable to a wide variety of uses in the chemical field.

At the present time, also, petroleum hydrocarbon reforming operations are widely employed to produce aromatic hydrocarbons such as benzene, xylene, ethylbenzene, cumene, etc. The mixed product obtained can readily be fractionally distilled to obtain fractions comprising compounds having the same molecular weight but in most instances such fractions cannot be separated into their components by conventional fractional distillation procedures. Various methods have been proposed for separating the paraxylene from reformates, for example, by fractional crystallization, and/or for converting the other components of reformate fractions into paraxylene but none of such methods have proved entirely satisfactory for large-scale commercial operation.

Accordingly, an object of this invention is to provide a process for the hydrodealkylation of hydrocarbons with a novel catalyst.

A further object of this invention is to provide a process for the demethylation of alkyl side chains which are attached to an aromatic nucleus.

A further object of this invention is to provide a process for selectively dealkylating ethylbenzene in the presence of other alkyl-substituted aromatics.

A further object of this invention is to provide an improved catalyst that is effective for the selective demethylation of hydrocarbons.

Other aspects, objects, as well as the several advantages of this invention will be apparent to those skilled in the art upon reading the specification and the appended claims.

2

SUMMARY OF THE INVENTION

In accordance with the invention, a process is provided for the selective dealkylation and demethylation of hydrocarbons comprising contacting same with a catalyst comprising iron group metals and calcium aluminate.

In accordance with one embodiment of the invention, it has been found that a stream comprising ethylbenzene and xylene can be subjected to dealkylating conditions by contacting said stream with a catalyst comprising iron group metals and calcium aluminate, whereby the ethylbenzene is selectively dealkylated to methane, ethane, toluene and benzene. This embodiment of the invention provides a practical method for separating ethylbenzene from xylene by converting the ethylbenzene to toluene and benzene which can readily be removed from the dealkylated product by simple distillation.

Further, in accordance with the invention, improved dealkylation catalysts comprising the iron group metals and calcium aluminate are provided. A presently preferred catalyst is cobalt and calcium aluminate.

DESCRIPTION OF PREFERRED EMBODIMENTS

The catalyst of the invention comprises calcium aluminate and at least one metal of the iron group metals. The iron group metals include iron, cobalt and nickel.

The amount of iron group metal, i.e., iron, cobalt, or nickel, present in the catalyst, can range from 0.5 to 40 weight percent, preferably 1 to 20 weight percent, with the remainder being calcium aluminate.

Calcium aluminate can be represented by the chemical formula $CaO \cdot Al_2O_3$, and calcium alumino silicate, which can also be used, is represented by the formula $$CaO \cdot Al_2O_3 \cdot 2SiO_2$$

The catalysts of the invention can be prepared by any of the procedures known to the industry such as by impregnation of the calcium aluminate with aqueous or nonaqueous solutions of the active ingredients, physical mixing, and the like. The iron group metals can be admixed with the calcium aluminate as a salt. Suitable iron group metal salts include nickel acetate, cobalt nitrate, cobalt chloride, iron nitrate, and the like. A presently preferred method for preparing the catalysts of the invention is to impregnate a preformed calcium aluminate pellet with a salt of an iron group metal.

For use in fixed bed operation, the catalyst can be granulated or pelleted at any suitable point during the preparation, such as after the formation of the metal-calcium aluminate mixture. For use in fluidized bed operations, such granulations or pelleting is unnecessary.

The catalyst of the invention, after bringing together iron group metals defined herein and the calcium aluminate, is activated prior to use as catalysts for dealkylation by calcining at elevated temperature. The calcination of the catalyst can be carried out by heating the catalyst with a stream of air at a temperature in the range 800–1,100° F. for a period of time ranging from, say, 30 minutes to several hours. The calcination step can be carried out in a separate contactor prior to placing the activated catalyst in the dealkylation apparatus or it can be carried out in situ prior to introduction of hydrocarbons to be dealkylated.

The hydrocarbon feed stocks processable according to the invention comprise naphthenes, paraffinic hydrocarbons and alkyl-aromatic hydrocarbons having up to and including 30 carbon atoms per molecule. The catalyst of the invention is particularly useful for the dealkylation and demethylation of hydrocarbons having from 6 to 12 carbon atoms. In a preferred embodiment, the feed stocks comprise predominantly ethylbenzene and xylene whereby the ethylbenzene is selectively dealkylated to toluene and benzene.

The present invention is particularly suitable for the hydrodealkylation of alkyl-aromatic compounds whereby the alkyl-aromatic compound is treated with hydrogen in the presence of the catalyst of the invention.

Examples of monoalkyl-aromatics that can be treated according to the invention include ethylbenzene, n-propylbenzene, isopropylbenzene (cumene), n-butylbenzene, tert-butylbenzene, 1-methylnaphthalene, 1-ethylnaphthalene, 2-methylnaphthalene, 2-ethylnaphthalene, 1-methylanthracene, 1-ethylanthracene, and the like.

Examples of dialkyl-substituted aromatic compounds that can be treated according to the invention include benzene and xylenes, after a substantial portion of the ethylbenzene has been converted, the xylene fraction is often fed to a crystallizer to separate p-xylene.

Specific example

Catalysts were prepared by adding cobalt to alumina, silica and calcium aluminate. These catalysts were used to hydrodealkylate ethylbenzene in the presence of xylene, as is illustrated by the table, the cobalt on calcium aluminate of the invention was considerably more active and retained activity about twice as long as the other two catalysts; i.e., cobalt-alumina and cobalt-silica. The conditions of temperature, pressure, liquid hourly space velocity, and hydrogen to hydrocarbon mol ratio, and conversions are set forth in the table.

TABLE

| | Catalyst | | | | | | | | |
|---|---|---|---|---|---|---|---|---|---|
| | Cobalt calcium-aluminate | | | Cobalt-alumina | | | Cobalt-silica | | |
| Run No. | 1 | 2 | 3 | 4 | 5 | 6 | 7 | 8 | 9 |
| Catalyst age, hrs. | 73 | 500 | 870 | 97 | 406 | 505 | 91 | 253 | 406 |
| Temperature, ° F. | 688 | 687 | 717 | 690 | 694 | 746 | 680 | 704 | 746 |
| Pressure, p.s.i.g. | 200 | 200 | 200 | 200 | 200 | 200 | 200 | 200 | 200 |
| LHSV | 4.0 | 3.8 | 4.0 | 2.2 | 2.3 | 2.2 | 2.2 | 2.2 | 2.1 |
| $H_2$/HC, mol ratio | 5.9 | 5.8 | 6.2 | 5.3 | 6.5 | 6.7 | 5.3 | 5.5 | 5.5 |
| Ethylbenzene conv.,[1] wt. percent | 53.9 | 27.7 | 20.3 | 65.3 | 20.2 | 18.0 | 43.4 | 18.6 | 17.6 |
| Xylene conv.[1], wt. percent | 14.8 | 5.4 | 3.2 | 17.4 | 5.6 | 2.2 | 4.3 | 1.0 | 1.3 |

[1] Feed composition, wt. percent; ethylbenzene 22.8, *p*-xylene 12.6, *m*-xylene 42.6, *o*-xylene 22.1. The product was principally toluene with a smaller amount of benzene.

p-xylene, p-ethyltoluene, p-propyltoluene, p-tertiarybutyltoluene, p-diethylbenzene, p-propylethylbenzene, p-diisopropylbenzene, 1,5-dimethylnaphthalene, 1-methyl-5-tert-butylnaphthalene, and the like.

Examples of naphthenes are methylcyclohexane, ethylcyclohexane, propylcyclohexane, 2-ethyldecalin, 2-butyldecalin, and the like. Examples of paraffins are neohexane, normal hexane, heptane, trimethylpentane, normal octane, and the like.

It is to be understood that the aforementioned compounds are only representative of the class of compounds which can be used and that the present invention is not necessarily limited thereto.

As is demonstrated by the working example hereinbelow, a catalyst comprising cobalt-calcium aluminate was quite effective and exhibited a long life in the selective dealkylation of ethylbenzene in the presence of xylene.

The dealkylation temperature employed can vary appreciably, but is generally in the range of from 500–1,200° F., preferably 600–900° F. The reaction pressure will ordinarily be in the range of atmospheric —2,000 p.s.i.g., preferably atmospheric —500 p.s.i.g. The total liquid hourly space velocity (LHSV) ordinarily ranges from 0.1–15, preferably 1–10. The mol ratio of hydrogen employed during dealkylation to hydrocarbon will ordinarily range from 0.5–20, preferably 1–10.

The process of the invention can be effected either as a batch or as a continuous operation. A continuous operation is, of course, preferred. When such a type of operation is used, the hydrocarbon to be dealkylated or demethylated is continuously charged in the reaction zone which contains a catalytic composition of the type hereinbefore set forth and wherein the reaction zone is maintained at proper operating conditions of temperature and pressure as set forth above. Hydrogen is charged to the reaction zone along with the hydrocarbon feed or separately in such a way as to maintain the hydrogen to hydrocarbon ratio within the limits set forth above. After passage through the reaction zone the reaction effluent is continuously withdrawn, the reaction mixture being separated from unreacted starting materials, the latter being recycled to form a portion of the feed stock, while the former is subjected to fractional distillation to recover the desired product. When the feed is a mixture of ethyl- Referring to the data in the above table, it should be noted that the liquid hourly space velocity was almost twice as high with the cobalt on calcium-aluminate catalyst compared with the other catalysts. Also noting the table above, the ethylbenzene conversion remained above 20 percent after 870 hours whereas the other two catalysts had dropped below 20 percent conversion long before that length of time.

The cobalt-calcium aluminate catalyst of the invention employed for runs 1, 2 and 3, set forth in the foregoing table, was prepared as follows: 28.3 g. cobalt nitrate dissolved in deionized water and made up to 44 ml. Solution was slowly added to 99.6 g. calcium aluminate granules while stirring. Substantially all of the solution was adsorbed. The granules were dried in a forced draft oven at 100° C. and calcined by heating to 900° F. in a stream of air and holding at 900° F. for 2.3 hours. The catalyst contained 6.3 weight percent cobalt.

The cobalt-alumina catalyst employed for runs 4, 5 and 6 in the foregoing table was prepared as follows: 23.4 g. cobalt nitrate, $Co(NO_3)_2 \cdot 6H_2O$, dissolved in deionized water and made up to 57 ml. This solution was slowly added to 88.8 g. of alumina granules while stirring. Substantially all of the solution was adsorbed by the granules. The granules were dried in a forced draft oven at 100° C. and calcined by heating to 900° F. in a stream of air and holding at 900° F. for 2 hours. The catalyst contained 4.6 weight percent cobalt.

The cobalt-silica catalyst employed for runs 7, 8 and 9 in the foregoing table was prepared as follows: 11.2 g. cobalt nitrate dissolved in deionized water and made up to 67 ml. Solution was slowly added to 42.6 g. of silica granules while stirring. Substantially all of the solution was adsorbed. The granules were dried in a forced draft oven at 100° C. and calcined by heating to 900° F. in a stream of air and holding at 900° F. for 2 hours. The catalyst contained 5.9 weight percent cobalt.

We claim:

1. A process for the dealkylation of hydrocarbons which comprises contacting a feed containing at least one dealkylatable hydrocarbon with an iron group metal catalyst and calcium aluminate at dealkylating conditions and in the presence of hydrogen.

2. A process according to claim 1 wherein the feed comprises alkyl aromatic hydrocarbons and dealkylation is effected at a temperature within the range 500–1200° F.

3. A process according to claim 1 wherein the amount of iron group metal in the catalyst ranges from 0.5 to 40 weight percent and the remainder is calcium aluminate.

4. A process according to claim 1 wherein the feed comprises ethylbenzene and xylene and dealkylation is effected at a temperature in the range of 500–1200° F. and the ethylbenzene is selectively dealkylated to toluene and benzene in the presence of xylene.

5. The process according to claim 4 wherein said catalyst is cobalt on calcium aluminate.

References Cited

UNITED STATES PATENTS

| | | | |
|---|---|---|---|
| 3,223,652 | 12/1965 | Erickson et al. | 252—466 |
| 3,243,386 | 3/1966 | Nielsen et al. | 252—466 |
| 3,388,074 | 6/1968 | Reitmeier | 252—472 X |

DELBERT E. GANTZ, Primary Examiner

G. E. SCHMITKONS, Assistant Examiner

U.S. Cl. X.R.

252—466, 473